July 20, 1965   D. DAVIDSON ETAL   3,195,358
SEALED HOUSING FOR ELECTRICAL APPARATUS
Filed Dec. 14, 1962   2 Sheets-Sheet 1
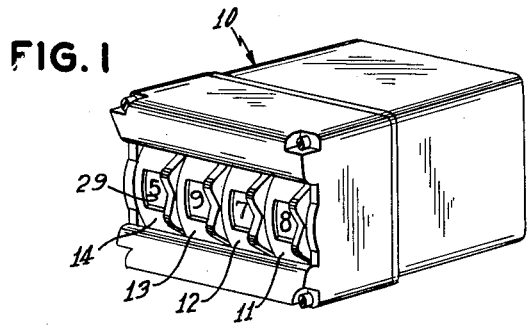
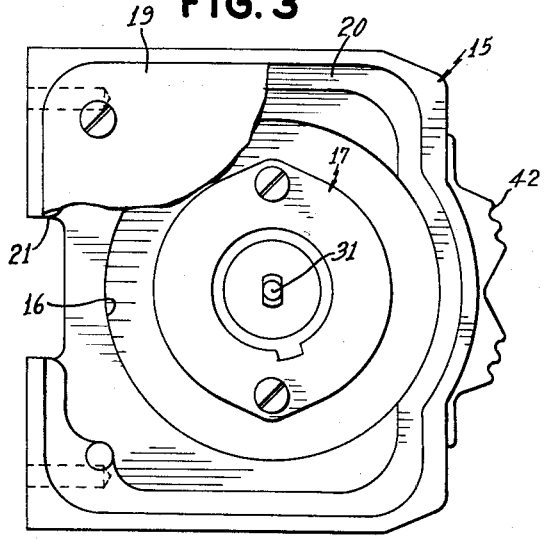
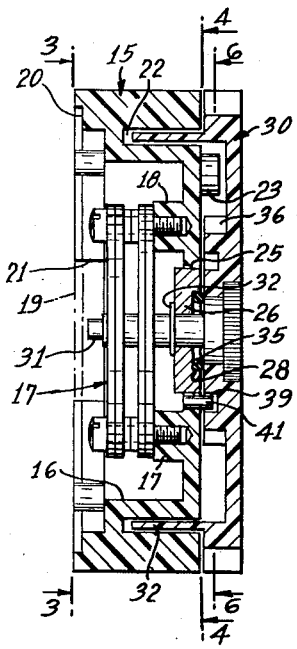
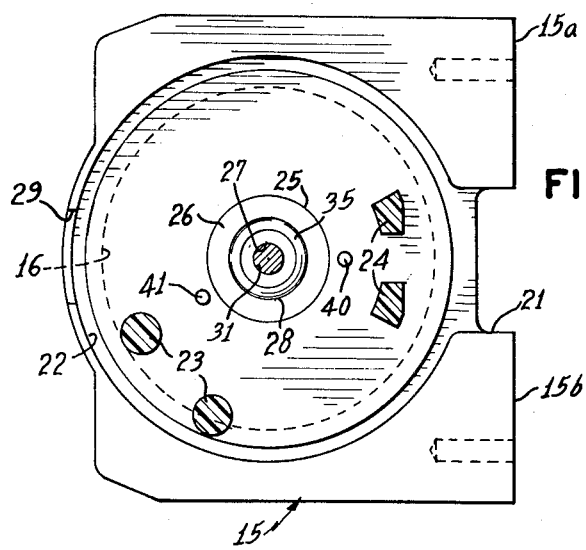
INVENTORS
JACK L. BAIR
DAVID DAVIDSON
BY James G. Eisenman
ATTORNEY July 20, 1965   D. DAVIDSON ETAL   3,195,358
SEALED HOUSING FOR ELECTRICAL APPARATUS
Filed Dec. 14, 1962   2 Sheets-Sheet 2

INVENTORS
JACK L. BAIR
DAVID DAVIDSON
BY
James A. Eisenman
ATTORNEY

United States Patent Office  
3,195,358  
Patented July 20, 1965

3,195,358
SEALED HOUSING FOR ELECTRICAL APPARATUS

David Davidson and Jack L. Bair, Syosset, N.Y., assignors to North Atlantic Industries, Inc., Plainview, N.Y., a corporation of New York
Filed Dec. 14, 1962, Ser. No. 244,837
9 Claims. (Cl. 74—10.1)

This invention relates to instrument housings and assemblies, and more particularly to modular, weather-tight housing assemblies for switches, potentiometers or the like and which include read-out indicators for showing the position or setting of the internal mechanism.

Present day requirements in the field of instrumentation often require that the positions or settings of internal components such as multiple contact switches, potentiometers or the like be read externally and that the movable parts be fully shielded from external moisture and contamination. In many cases there is a further requirement that the instrument incorporate protective or control functions such as detents and limit stops. Such diverse performance specifications tend to be incompatible in that one requirement is often met only at the expense of another in the final design.

It is therefore one object of the present invention to provide a new and improved instrument housing affording visual read-out characteristics for internal mechanism including switches, potentiometers and other like devices.

Another object of the invention is to provide a modular instrument housing or unit affording a digital read-out which is capable of being assembled or stacked in multiples to afford an integrated read-out.

Still another object of the invention is to provide a weather-tight instrument housing affording a visual read-out and which facilitates operation of internal mechanism externally by either manual or motor means.

It is still another object of the present invention to provide a weather-tight externally actuable instrument affording visual read-out and weather-tight characteristics and which also incorporates means to releasably fix the positions of movable internal parts over a range of predetermined positions.

The above and other objects and features of the present invention will be apparent from the following specification describing preferred embodiments thereof taken in conjunction with the accompanying drawings in which, FIG. 1 is a view in perspective showing an assembled instrument incorporating a series of four modular subassemblies or modular units formed in accordance with the present invention;

FIG. 2 is a view in enlarged scale in vertical section taken through the center of one of the modular units of the instrument of FIG. 1;

FIG. 3 is a view in side elevation showing the unit of FIG. 2 and as viewed looking in the direction of the arrows 3—3 of FIG. 2;

FIG. 4 is a view in side elevation of the molular or housing assembly of FIG. 2 looking in the direction of the arrows 4—4 with the thumb wheel or actuator portion removed;

Figure 6:
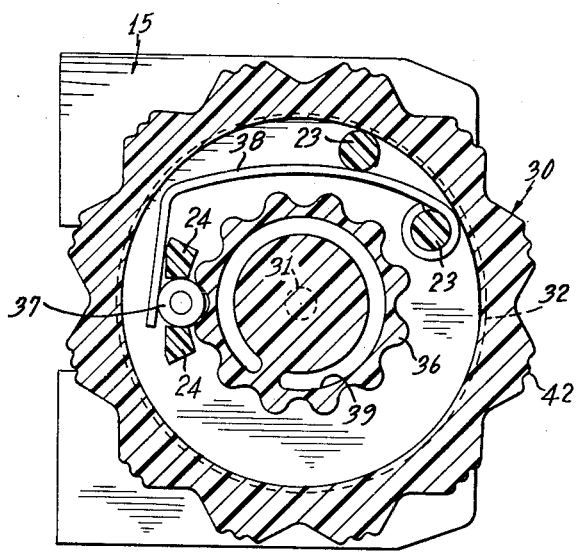
Figure 5:
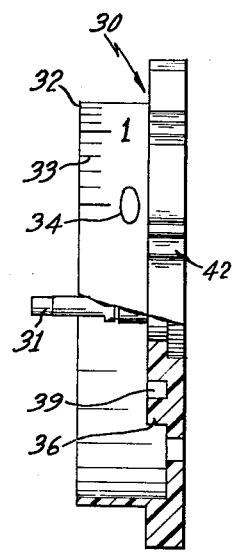

FIG. 5 is a view in end elevation of the thumb wheel or actuator portion of the modular subassembly of FIG. 2 shown partially in vertical section; and FIG. 6 is a view in vertical section taken on the line 6—6 of FIG. 2 illustrating the detent mechanism for establishing a range of predetermined positions for the thumb wheel or actuator portion taken on the line 6—6 of FIG. 2 looking in the direction of the arrows.

Referring to the drawings, the invention is illustrated as embodied in a modular unit illustrated in detail in FIGS. 2 through 6. FIGURE 1 shows an instrument 10 such as a multiple switch, ratio divider or the like which includes a series of four subassemblies or modular units 11, 12, 13 and 14 stacked side by side in a horizontal array so as to display their digital read-out horizontally. In the illustrated embodiment of the invention each modular unit includes its own internal mechanism which can take the form, for example, of multiple-position switches, potentiometers, or other variables of an adjustable electrical device.

Referring to FIGS. 2–6, each modular unit includes a basic housing portion 15 having substantially parallel front and back sides and formed in the back surface with a generally cylindrical cavity 16 (FIGS. 2 and 3) for containing adjustable electrical mechanism indicated generally by the numeral 17. For purposes of illustration, electrical mechanism 17 is illustrated as a multiple contact switch. The electrical assembly 17 is secured to the housing 15 by means of bosses 17 and 18. The cavity 16 is adapted to be closed by means of a back plate 19 (FIG. 3) seated in a recess 20 to afford a weather-tight seal. If desired, the surface area of the housing abutting the back plate can include a gasket or layer of sealing material. Electrical leads (not shown) are introduced into the cavity 16 through a recess 21 through an appropriate sealing bushing (also not shown). The edge of the housing 15 includes mounting portions 15a and 15b outside of the cavity 16 and suitably tapped to receive mounting screws.

The reverse or front side of the housing portion 15 (FIG. 14) includes a channel or track 22 having a substantial depth and defined on one side, radially speaking, by the mounting portions 15a and 15b and defined on the inner side by the walls of the cavity 16. No portion of the groove 22 communicates with the cavity 16. Formed on the front surface of the housing 15 inside the channel 22, radially speaking, are a first pair of lugs or bosses 23 of cylindrical contour and a second pair of upstanding bosses or lugs 24 of quadrangular contour. The center of the surface carrying the lugs 23 and 24 is pierced by an opening 25 within which is permanently mounted in sealing relationship an insert 26 having a central opening 27 circumscribed by a recess or relieved portion 28 (FIGS. 2 and 4). In addition to the recess 21 the external edge wall of the housing 15 is formed with a cutout 29 exposing the circular channel 22 and affording a viewing window as best seen in FIG. 1. If desired, the window can be covered with a transparent sheet material, amplifying lens or the like.

Mounted adjacent the surface of the housing 15 seen in FIG. 4 is an actuating member 30, in this case a thumb wheel best seen in FIGS. 2, 5 and 6. The actuating member includes a central mounting shaft 31 which is seated in the opening 27 of the housing portion 15 for rotary movement and is held therein by suitable means such as a snap ring 32. The shaft 31 is coupled at its inner end to the electrical mechanism 17 for turning movement therewith. The circular outer edge of the actuating member 30 comprises a serrated annular rib 42 in the illustrated embodiment of the invention affording friction surfaces for use as a thumb wheel. As best seen in FIG. 3 the rib or thumb wheel portion 31 projects radially beyond the housing adjacent the viewing window 29 in order to be accessable to the operator of the instrument. The actuating member 30 includes a thin-walled cylindrical extension 32 adapted to be received in the groove or channel 22 and to turn therein. The exterior surface of the cylindrical extension 32 carries suitable calibrations 33 and numerals 34 which can be seen through the viewing opening 29. A sealing O ring 35 (FIG. 2) is seated in the space defined by the recess 28 and engages both the stationary housing portion 15 and the movable actuating member 30 in sealing relationship. Thus access to the internal chamber 16 which is already effectively protected by the tortuous path defined by the seating of the cylindrical extension 32 in the groove 22 is totally sealed from external influences including moisture, dirt and the like.

If desired, the modular assembly can be used in the form above described. If, however, it is desired to include detent means for establishing a series of predetermined releasable settings for the actuating member or thumb wheel 30, and hence with internal electrical mechanism 17, the inner surface of the thumb wheel can be formed with a toother circular surface 36 having a radius less than the radius of the cylindrical extension 32 and also less than the radial spacing of the lugs 23 and 24 of the housing portion 15. When the actuating member 30 and the housing portion 15 are assembled, as best seen in FIG. 6, the lugs 23 and 24 will therefore be disposed in the space between the toothed or gear-like member 36 and the cylindrical wall 32. A detent ball or roller 37 is disposed between the lugs 24 and is urged radially inwardly against the toothed member 36 by a spring finger 38 mounted on and held by the lugs 23. Thus, as the actuating member 30 is rotated the detent member 37 will position it releasably in a series of angularly spaced positions.

In the event it is desired to control or limit the total angular displacement of the actuating member 30, as might be required for example to protect the electrical mechanism 17, stop means can be provided in the form of an arcuate channel or groove 39 formed in the inner surface of the actuating member 30, or in the illustrated embodiment, in the portion 36. Stop pins 40 and 41 (FIG. 4) piercing the wall of the housing portion 15 are received in the channel 39, as best seen in FIG. 2, and by appropriate selection of the angular positions of the stop pins 40 and 41 the angular travel of the control member 30 can be precisely determined.

It will be understood that the invention can take other forms and arrangements. Thus, for example, the thumb wheel can be replaced by another type of actuator such as a rotary solenoid. Also, the modular units can carry various types of electrical mechanism such as potentiometers, stepping switches, inductances and the like, all of which can be actuated externally and which are shielded by the weather-tight housing assembly. The invention should not therefore be limited except as defined by the following claims.

We claim:

1. A sealed externally actuatable electrical unit comprising a housing having edge and side walls defining an internal chamber to receive variable electrical control means, said side walls being substantially parallel on at least their external surfaces, a rotary actuating member having a cylindrically curved portion carrying indicia on the external surface thereof and overlying the edge of said chamber and adapted to be viewed edgewise of said unit, said housing including a portion extending at least in part beyond the radial extremity of said cylindrically curved portion of the actuating member and overlying at least a portion of the exterior surface thereof to define a channel receiving said curved portion, and a rotary shaft at the center of the cylindrically curved portion journalled in the housing and coupled to the actuating member to drive the electrical control means and coupled to the cylindrically curved portion whereby the latter turns in rotary motion therewith.

2. Apparatus as set forth in claim 1, said actuating member including a flat plate carrying the cylindrically curved portion and overlying the proximate side wall of the housing, and a flexible sealing ring between the opposed surfaces of the plate and housing and surrounding the shaft.

3. Apparatus as set forth in claim 1, said actuating member including a flat plate carrying the cylindrically curved portion and overlying the proximate side wall of the housing, said opposed surfaces of the plate and housing being spaced apart to define a shallow chamber, and detent means within the shallow chamber releasably coupling the housing and the actuating member.

4. Apparatus as set forth in claim 3, said detent means including a toothed detent wheel on the inner surface of the plate member coaxial with said shaft and having a radius substantially greater than that of the shaft, a detent engaging the detent wheel and spring means carried by the housing to urge the detent against the detent wheel.

5. Apparatus as set forth in claim 1, said actuating member including a flat plate carrying the cylindrically curved portion and overlying the proximate side wall of the housing, said plate member being radially extended beyond an edge wall portion of the housing to afford a thumb wheel drive.

6. Apparatus as set forth in claim 1, including stop means to limit the rotary movement of the actuating member.

7. Apparatus as set forth in claim 6, including an annular groove formed in the inner surface of the plate member coaxially of said shaft, and pin means secured to the housing and entering the annular groove.

8. Apparatus as set forth in claim 1, said housing portion which extends beyond the cylindrically curved portion of the actuating member including mounting means for said unit, whereby the unit can be mounted by said extended portion, and whereby a plurality of units can be stacked side by side, in an integrated assembly.

9. Apparatus as set forth in claim 1, said side wall on the opposite side of the housing from said actuating member including a removable cover plate to afford access to said cavity without removing the actuating member from the unit.

References Cited by the Examiner

UNITED STATES PATENTS

| | | | |
|---|---|---|---|
| 1,182,583 | 9/31 | De Tar | 74—10.45 |
| 2,288,406 | 6/42 | Kimball | 74—527 |
| 2,447,718 | 8/48 | Simpson | 74—527 |
| 2,592,392 | 4/52 | Canziani et al. | 74—10 X |
| 2,665,811 | 10/53 | Behrens | 74—10.54 |
| 2,768,603 | 10/56 | Fisher | 74—10 X |

BROUGHTON G. DURHAM, *Primary Examiner.*